Feb. 24, 1953  R. P. MOLITOR  2,629,134
METHOD OF MANUFACTURING ARTICLES FROM VINYL RESINS
Filed June 27, 1950
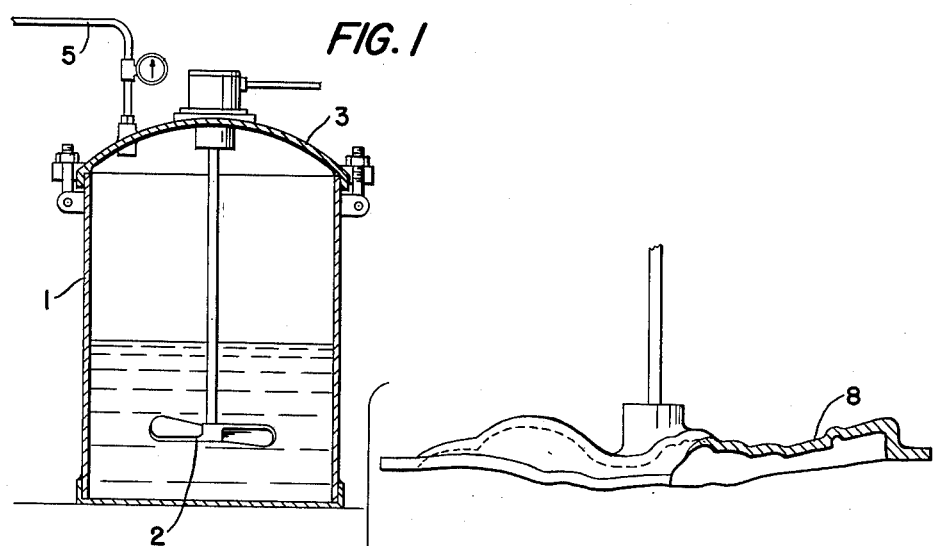
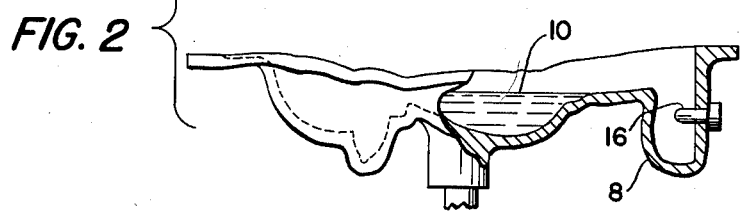
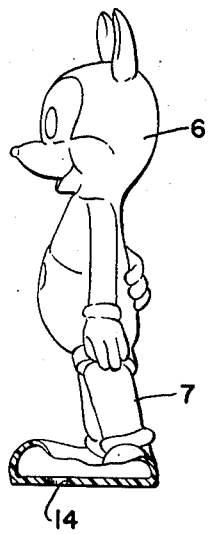
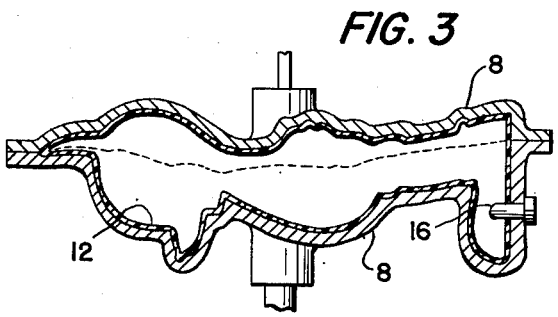
INVENTOR.
ROBERT P. MOLITOR
BY
Ely & Frye
ATTORNEYS Patented Feb. 24, 1953

2,629,134

UNITED STATES PATENT OFFICE 2,629,134

METHOD OF MANUFACTURING ARTICLES FROM VINYL RESINS

Robert P. Molitor, Akron, Ohio, assignor to The Sun Rubber Company, Barberton, Ohio, a corporation of Ohio Application June 27, 1950, Serial No. 170,515

4 Claims. (Cl. 18—58.3)

The present invention relates to a new and improved method of manufacturing articles from synthetic resins and particularly from polyvinyl chloride and similar vinyl polymers and copolymers, which are peculiarly adaptable for the manufacture of hollow articles such as dolls, doll heads, figure toys, and balls, although the invention may be employed for the manufacture of all sorts of articles for which resins of this type are suitable.

Of the numerous artificial resins of the type set forth, vinyl chloride polymer, when compounded with suitable plasticizers and other ingredients, is especially useful in the manufacture of dolls and children's toys because of its appearance and feel to the hand. In many respects it is superior to rubber in this field. The commercial adaptation and use of this and similar materials in these fields has been retarded because the manufacturing processes and technique have not been sufficiently developed so that satisfactory articles may be made in production quantities. Experimental work has shown that material of this nature has great possibilities but, so far as known, the methods have not heretofore been perfected to the extent required for successful commercial use.

It is the major purpose of the present invention to improve upon the process and technique of manufacturing hollow, molded articles of polyvinyl chloride and copolymers, such, for example, as the copolymer of vinyl chloride and vinyl acetate so that these materials may be used in regular manufacture of such articles and the product will be uniform, of the proper texture and elasticity, with a minimum of rejects and seconds.

Accordingly, this application is designed to disclose the details of a preferred process which has proven to be satisfactory for the purposes set forth. While the details of the process are given to a sufficient extent to enable the process to be employed, variations and modifications may be resorted to without sacrificing the benefits of the invention as it is set forth in the appended claims.

In order to illustrate certain of the steps, the attached drawings show steps which are employed in the manufacture of small, hollow dolls, but it will be understood that the method may be employed in the manufacture of other articles by suitable adaptation of the basic principles of the process. In the drawings:

Fig. 1 shows a typical form of apparatus which may be used for the preparation of the polyvinyl chloride or its equivalent.

Fig. 2 shows a typical mold which is used in the manufacture of small dolls.

Fig. 3 shows the mold in another stage of the process.

Fig. 4 shows a typical doll such as made by the process.

The basic materials used in the process are a vinyl polymer and suitable plasticizers. The former is available on the market in the form of powders of minute particle size. Plasticizers are well known in the art and a variety of such materials may be employed, depending largely upon the physical properties desired in the final product. It is desirable to use a combination of plasticizers for the various properties and qualities each contributes to the final product. Fillers and pigments may also be employed to give color and body to the finished product. All of the added materials may be varied and the properties thereof are likewise variable within the knowledge of any compounder familiar with the art. It is not intended to restrict the invention to any particular or specific materials or proportions thereof, those recited below being an example of actual successful commercial formulae which have been employed in the manufacture of hollow toys, doll heads, and other useful articles to which polyvinyl chloride resins are especially adaptable.

In the practice of the invention the plasticizing batch is first mixed. Such a plasticizing batch as has been used in the process consists of dioctyl phthalate, which is a standard plasticizer for resins of this type. To this is added a quantity of dioctyl adipate, the purpose of which is to eliminate or reduce any tendency of the batch to increase viscosity. There is also added what is termed an "extender" which increases the volume of the plasticizer batch. For this purpose, there has been employed the material available on the market under the trade name HB-40, which is described by the maker as a partially hydrogenated mixture of isomeric terphenyls. It is necessary and desirable to add a stabilizer to prevent decomposition of the batch and for this purpose barium resin oleate may be employed, although other stabilizers are well known and could be used.

The above materials or equivalents thereof are thoroughly mixed in any suitable vessel, such as that shown at 1 in Fig. 1, equipped with a power driven stirrer 2.

When the ingredients of the plasticizer have been thoroughly mixed, the vinyl polymer powder is added to the batch and then any suitable fillers are added. These fillers are inert and are merely to give the desired body to the finished product. Such materials as clay and whiting have been employed. With the fillers, any desired pigment is added to color the product if such is desirable. The fillers and pigment are ground to a very fine particle size so that they will disperse uniformly throughout the body of the casting batch.

It is desirable first to agitate the batch in the vessel 1 to throughly wet the dry powders, i. e., the polyvinyl chloride or its equivalent, and the fillers and pigments if any. When the batch has been thoroughly mixed, the cover 3 is clamped tightly on the vessel and the speed of the agitator 2 is increased. At the same time, the interior of the vessel is connected to a source of vacuum, illustrated by the connection 5, which removes the air from the interior of the vessel and from the batch. The vacuum is maintained during the entire beating operation and should be as high as practical. A vacuum from 25 to 27 inches is normally maintained during the process.

The final mixing of the casting batch under vacuum is an important and essential step in the process. Of necessity, a substantial quantity of air is entrapped in the batch when the dry powders are mixed therewith and it is necessary to remove all of the air therefrom; otherwise the final gelling and fusing of the resin will not proceed properly and the goods made will be spongy or porous or exhibit spots and blisters which make the goods unsalable. The time required for finishing the casting batch may vary and experience with the process will teach the compounder the correct duration of the beating and evacuating period. Usually not less than one hour of vigorous agitation, under as high a vacuum as practical, is required to remove all of the air from the casting batch. When the casting batch is completed it will be found to be a smooth, homogeneous liquid, with the resin powder and fillers thoroughly dispersed in the batch and no air bubbles will rise to the surface no matter how long the batch is allowed to stand. The simultaneous beating and evacuation is important to obtain the desired results.

The viscosity of the final casting batch will depend upon the proportion of the plasticizer batch to the vinyl resin powder. The initial viscosity of the casting batch is determined by the firmness and elasticity desired in the finished product. Depending upon the physical properties of the finished product, the proportion of plasticizer to vinyl resin may vary from 25% to 150%. By adopting such proportions of the vinyl resin and plasticizer, the initial viscosity may be 5,000 centipoises and upward.

Without in any sense limiting the invention to the proportions set forth, the following is a detailed description of one adaptation of the invention which gives a suitable formula and procedure used for the manufacture of hollow toys of polyvinyl chloride such as illustrated in Fig. 4 of the drawings:

The plasticizer batch is composed of—

|   | Lbs. | Oz. |
|---|---|---|
| Dioctyl phthalate | 5 | 6 |
| Dioctyl adipate | 3 | 10 |
| HB-40 | 2 | 6 |
| Barium resin oleate |  | 10 |
|   | 12 |   |

After the above materials have been thoroughly mixed in the vessel, 2 lbs. and 11 oz. of filler and 14 lbs. of any vinyl polymer powder are added to the liquid plasticizer and the powders thoroughly wetted by the plasticizer. The vessel is then sealed and the batch is vigorously agitated for one hour while a vacuum of 27 inches is maintained in the vessel. The resultant casting batch is a smooth, homogeneous liquid of about the consistency of ordinary cream. It is wholly free of entrapped air bubbles and is ready for the next or casting operation. The casting batch may be stored or it may be conducted immediately to the supply point for the casting operation.

While the process from this point may be carried out in individual molds, for commercial production it is desirable to use an automatic machine in which a multiplicity of molds on an endless conveyor are carried through a charging station where a charge of the casting material sufficient to form the outer shell 7 of the toy 6 is loaded in one section of a matrix or mold 8, as shown in Fig. 2, in which the supply of the casting batch is indicated at 10. The mold is then closed and firmly clamped together to prevent loss of the material and is then rotated continuously in various planes so that the material forms a uniform deposit 12 over the entire inner surface of the mold. The casting material first gels on the inner wall of the mold and then, as the molds continue their movement through a heated chamber, the skin or shell fuses to form the wall of the finished product. The mold is then cooled, usually by a water spray until the temperature of the product is well below the fusing point and the mold opened and the product removed. It is desirable, owing to the temperature of the air within the body of the finished product, to vent the product, usually after it is removed from the mold; otherwise, on cooling, the product will collapse. Venting of the product is shown at 14 in Fig. 4.

A suitable apparatus for continuous internal casting is shown in the application of Henry Martin and Paul Rekettye, Serial No. 179,726, filed August 16, 1950, but while the process is adaptable for use in the machine shown and described therein, it is by no means confined to that or to any particular type of apparatus.

It will be noted particularly that the amount of the charge which is loaded into the mold is sufficient to form a shell of the desired thickness over the inside of the matrix or mold cavity and that there is no ungelled or unset residue of the casting material. In former attempts it has been the practice to load the matrix and permit a certain amount of the casting material to form a shell on the inner wall of the mold, and then to pour out the excess or ungelled content of the mold. By the compounding of the material and the injection in the matrix of the exact quantity thereof necessary to form the shell, the step of dumping ungelled or unset casting material is not required, thus not only simplifying the process but also making it adaptable for continuous machine operations.

The heat required first to gel and then to fuse the vinyl resins will vary with the compounding, but it is normally from 300° to 400° F. The time required depends upon a number of factors such as the composition of the casting material and the heat conductivity of the mold. Usually, the mold is subjected to radiant heat and the period which is required to bring the interior of the mold to fusing temperature and the period which is necessary to complete the process will be governed by the requirements in each case. In the example given, the temperature of the interior of the mold was maintained at approximately 400° F. for two minutes.

It will be noted that during the gelling and fusing period the mold is completely closed, which means that the pressure within the mold necessarily is maintained at a high degree. This internal pressure acting upon the shell of the vinyl resin deposited on the inner wall of the matrix is believed to be an important factor in achieving the quality of the finished product.

After the fusing period is completed the mold is cooled to a point well below the fusing temperature and to a point where the finished article can be removed from the mold without injury, and handled, and yet the reduction of pressure will not cause the article to collapse. This is usually done by subjecting the mold to a water spray, which will reduce the temperature to between 180° and 200° F. After the article is removed from the mold, it is vented as described. This last step might also be done by placing a pin, such as 16, in the mold which would form the aperture in the wall of the articles during the casting.

Any rind which may be occasioned by seepage of a small amount of casting material through the parting line of the mold is trimmed off and the article is completed.

One of the advantages of the process is that by the employment thereof the most intricate matrix patterns will be accurately and faithfully reproduced in the finished article, the casting material filling all of the recesses of the matrix.

While the process has been perfected especially in the field of manufacturing hollow articles, such as children's toys, it has been found that the casting material, formed by the process which has been described, may be used in other casting procedures in which a layer of the casting material is deposited on a form, or other foundation or support, and then fused thereon.

What is claimed is:

1. The process of making hollow articles from a liquid mixture of a vinyl resin and a plasticizer therefor, comprising the steps of depositing a measured charge of the said mixture in a hollow sectional mold, said charge being less in volume than the volume of the mold, said mold having non-porous inner surfaces, closing the mold with the charge therein to retain the charge within the cavity, rotating the mold in a multiplicity of planes to distribute the charge as a layer over the entire inner surface of the mold cavity, heating the layer to gel it against the inner surface of the mold while the mold is rotating, then applying additional heat to the closed mold to raise the temperature thereof sufficiently to fuse the gelled layer against the inner surface of the mold, cooling the mold until the temperature of the layer is below the fusing point of the material, opening the mold and removing the article therefrom.

2. The process of making hollow articles from a deaerated liquid mixture of a vinyl resin and a plasticizer therefor, comprising the steps of depositing a measured charge of said mixture in a hollow sectional mold, the inner surface of which is non-porous, the charge being less in volume than the volume of the mold, closing the mold with the charge therein to retain the entire charge within the cavity, rotating the mold in a multiplicity of planes to distribute the charge as a layer over the entire inner surface of the mold cavity, applying heat to the mold during rotation to gel the layer against the inner surface of the mold cavity, further heating the closed mold to fuse the gelled layer, cooling the mold until the temperature of the layer is below the fusing point of the material, opening the mold and removing the article therefrom.

3. The process of making hollow articles from a deaerated liquid mixture of a vinyl resin and a plasticizer therefor comprising the steps of depositing a measured charge of said mixture in a hollow sectional mold, the inner surface of said mold being non-porous, the charge being less in volume than the volume of the mold, closing the mold and maintaining it in closed condition to prevent the escape of the deaerated mixture and air from the mold cavity, revolving the closed mold in a multiplicity of planes and for a sufficient period to distribute the charge of deaerated mixture as a layer of uniform thickness over the entire inner surface of the mold, heating the mold during its revolution to cause the mixture to gel, applying additional heat to said mold to fuse the gelled layer, then cooling the mold until the temperature of the layer is below the fusing point thereof, opening the mold and removing the article therefrom.

4. The process of making hollow articles from a liquid mixture of a vinyl resin and a plasticizer therefor, comprising the steps of depositing a measured charge of said mixture in a hollow sectional mold, the inner surface of which is non-porous, the charge being less in volume than the volume of the mold, closing the mold and maintaining it in closed condition to prevent the escape of the mixture and air from the mold cavity, heating the closed mold and at the same time revolving it in a plurality of planes and for a sufficient period to cause the mixture to gel as a layer of uniform thickness over the entire inner surface of the mold, applying further heat to said mold to fuse the gelled layer, then cooling the mold until the temperature of the gelled layer is below the fusing point thereof, opening the mold and removing the article therefrom.

ROBERT P. MOLITOR.

REFERENCES CITED

The following references are of record in the file of this patent:

UNITED STATES PATENTS

| Number | Name | Date |
|---|---|---|
| 1,998,897 | Kay | Apr. 23, 1935 |
| 1,995,977 | Gonda | Mar. 26, 1935 |
| 2,219,700 | Perrin | Oct. 29, 1940 |
| 2,345,013 | Soday | Mar. 28, 1944 |
| 2,469,892 | Rempel | May 10, 1949 |
| 2,477,273 | Tognola | July 26, 1949 |

FOREIGN PATENTS

| Number | Country | Date |
|---|---|---|
| 500,298 | Great Britain | July 28, 1938 |